(12) United States Patent
Tomokage et al.

(10) Patent No.: US 9,290,101 B2
(45) Date of Patent: Mar. 22, 2016

(54) POWER CONTROL UNIT FOR ELECTRIC VEHICLE WITH CONVERTERS COOLED BY SURFACES OF A COOLING UNIT

(75) Inventors: Ryoji Tomokage, Utsunomiya (JP); Atsushi Amano, Utsunomiya (JP); Yuichi Mochizuki, Nagoya (JP); Yusuke Gotou, Saitama (JP); Tomoyuki Suzuki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 367 days.

(21) Appl. No.: 13/885,365

(22) PCT Filed: Oct. 24, 2011

(86) PCT No.: PCT/JP2011/074431
§ 371 (c)(1),
(2), (4) Date: May 14, 2013

(87) PCT Pub. No.: WO2012/070346
PCT Pub. Date: May 31, 2012

(65) Prior Publication Data
US 2013/0241486 A1 Sep. 19, 2013

(30) Foreign Application Priority Data
Nov. 22, 2010 (JP) ................................. 2010-259632

(51) Int. Cl.
*H02J 7/00* (2006.01)
*B60L 11/18* (2006.01)
(Continued)

(52) U.S. Cl.
CPC ............. *B60L 11/1812* (2013.01); *B60L 1/003* (2013.01); *B60L 3/003* (2013.01); *B60L 11/1803* (2013.01); *B60L 11/185* (2013.01); *B60L 11/1816* (2013.01); *B60L 11/1818* (2013.01); *B60L 11/1868* (2013.01); *H02M 7/003* (2013.01); *B60L 2210/12* (2013.01); *B60L 2210/30* (2013.01); *B60L 2240/36* (2013.01); *B60L 2240/525* (2013.01); *Y02T 10/7005* (2013.01);
(Continued)

(58) Field of Classification Search
CPC ....................... B60L 2240/36; B60L 2240/525
USPC .......................................................... 320/109
See application file for complete search history.

(56) References Cited

U.S. PATENT DOCUMENTS 7,851,954 B2 * 12/2010 Endo ..................... B60K 6/26 310/68 D
2008/0060370 A1 * 3/2008 Keene et al. ................... 62/236
(Continued)

FOREIGN PATENT DOCUMENTS

CN 101460045 A 6/2009
JP 06-298155 A 10/1994
(Continued)

*Primary Examiner* — Yalkew Fantu
*Assistant Examiner* — Manuel Hernandez
(74) *Attorney, Agent, or Firm* — Squire Patton Boggs (US) LLP (57) ABSTRACT

A power control unit for an electric vehicle is provided with: a first electric power converter used during traveling and cooled by a first surface of a cooling section; and a second electric power converter used during charging from an electric power source outside the vehicle and cooled by a second surface of the cooling section. The first electric power converter and the second electric power converter are arranged at positions superposed on each other when viewed in the direction from the first surface to the second surface.

4 Claims, 8 Drawing Sheets

(51) Int. Cl.
*H02M 7/00* (2006.01)
*B60L 1/00* (2006.01)
*B60L 3/00* (2006.01)

(52) U.S. Cl.
CPC .......... *Y02T 10/7066* (2013.01); *Y02T 10/7233* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(56) References Cited

U.S. PATENT DOCUMENTS

| | | | |
|---|---|---|---|
| 2009/0289583 A1* | 11/2009 | Yoshida | 318/400.01 |
| 2010/0045103 A1* | 2/2010 | Mitsutani | 307/9.1 |
| 2010/0050676 A1* | 3/2010 | Takamatsu et al. | 62/259.2 |
| 2010/0100266 A1* | 4/2010 | Yoshinori | B60K 1/04 701/22 |
| 2010/0188814 A1* | 7/2010 | Nakatsu | H02M 7/003 361/689 |
| 2010/0213896 A1* | 8/2010 | Ishii et al. | 320/109 |
| 2011/0000241 A1* | 1/2011 | Favaretto | 62/244 |
| 2012/0102995 A1* | 5/2012 | Sakata | 62/238.1 |
| 2012/0262881 A1* | 10/2012 | Onimaru et al. | 361/701 |
| 2012/0323427 A1* | 12/2012 | Endo | B60K 6/445 701/22 |
| 2013/0235526 A1* | 9/2013 | Watanabe | 361/699 |
| 2014/0000860 A1* | 1/2014 | Nishizawa et al. | 165/202 |
| 2014/0027089 A1* | 1/2014 | Hisada | 165/11.1 |
| 2014/0098588 A1* | 4/2014 | Kaneko | H02M 7/003 363/141 |
| 2014/0126154 A1* | 5/2014 | Higuchi | B60L 11/1803 361/714 |
| 2014/0339009 A1* | 11/2014 | Suzuki et al. | 180/232 |

FOREIGN PATENT DOCUMENTS

| | | |
|---|---|---|
| JP | 11-266508 A | 9/1999 |
| JP | 2008-103108 A | 5/2008 |
| JP | 2009-247057 A | 10/2009 |
| JP | 2009-267131 A | 11/2009 |
| JP | 2010-10505 A | 1/2010 |

* cited by examiner

FIG. 8

POWER CONTROL UNIT FOR ELECTRIC VEHICLE WITH CONVERTERS COOLED BY SURFACES OF A COOLING UNIT

CROSS-REFERENCE TO RELATED APPLICATIONS

This application is a National Stage entry of International Application No. PCT/JP2011/074431, filed Oct. 24, 2011, which claims priority to Japanese No. 2010-259632, filed Nov. 22, 2010. The disclosures of the prior applications are hereby incorporated in their entirety by reference.

TECHNICAL FIELD

The present invention relates to a power control unit for electric vehicles, which charges an electric energy storage device mounted on a vehicle from a power supply located outside of the vehicle, and further supplies electric power from the electric energy storage device to an electric motor in the vehicle in order to generate propulsive power for the vehicle.

BACKGROUND ART

Electric vehicles employ an arrangement for cooling a power converter (see, for example, Japanese Laid-Open Patent Publication No. 2009-267131, hereinafter referred to as "JP 2009-267131 A"). According to JP 2009-267131 A, a cooling unit, having cooling fins (62), a recess (63), and a coolant water passage (64), is provided for cooling a power control unit (PCU) (31), etc. (see FIG. 5, paragraph [0051]). An inverter IPM (Intelligent Power Module) (39, 40) of the PCU is mounted on a surface (an upper surface as shown in FIG. 5) of the cooling unit. A DC/DC converter (60) and an inverter (61) for an air-con are mounted on another surface (a lower surface as shown in FIG. 5) of the cooling unit (see FIG. 5, paragraph [0050]). There is no clear explanation as to whether the term "air-con" is intended to stand for an air compressor or an air conditioner.

SUMMARY OF INVENTION

According to JP 2009-267131 A, as described above, the inverter IMP is mounted on one surface of the cooling unit, whereas the DC/DC converter and the inverter for the air-con are mounted on another surface of the cooling unit. However, there is still room for improvement with respect to cooling efficiency.

The present invention has been made in view of the aforementioned problems. It is an object of the present invention to provide a power control unit for electric vehicles, which is capable of improving cooling efficiency for a plurality of power converters.

According to the present invention, there is provided a power control unit for an electric vehicle, which charges an electric energy storage device mounted on the electric vehicle from a power supply located outside of the electric vehicle, and supplies electric power from the electric energy storage device to an electric motor in the electric vehicle thereby to generate propulsive power for the electric vehicle, the power control unit comprising a housing, a cooling unit disposed in the housing and having a first surface and a second surface opposite to the first surface with a refrigerant passage interposed therebetween, a first power converter, which operates while the electric vehicle is being driven, the first power converter being cooled by the first surface of the cooling unit, a second power converter, which operates while the electric energy storage device is being charged by the power supply located outside of the electric vehicle, the second power converter being cooled by the second surface of the cooling unit, a third power converter, which operates while the electric vehicle is being driven and while the electric energy storage device is being charged by the power supply located outside of the electric vehicle, the third power converter being cooled by the second surface of the cooling unit, and electric power conductors interconnecting the first power converter, the second power converter, and the third power converter. The electric power conductors include a housing wall penetrating region that joins the inside of the housing and the outside of the housing to each other, a cooling unit traversing member interconnecting a first surface side and a second surface side of the cooling unit, a first branch interconnecting the housing wall penetrating region, the cooling unit traversing member, and the first power converter on the first surface side, and a second branch interconnecting the cooling unit traversing member, the second power converter, and the third power converter on the second surface side. The first power converter and the third power converter are disposed in different positions as viewed along a direction from the first surface toward the second surface of the cooling unit, and the first power converter and the second power converter are disposed in overlapping positions as viewed along the direction from the first surface toward the second surface of the cooling unit.

According to the present invention, the first power converter and the third power converter, which operate while the electric vehicle is being driven, are not disposed in overlapping positions with the refrigerant passages interposed therebetween. The first power converter, which operates while the electric vehicle is being driven, and the second power converter, which operates while the electric energy storage device is being charged, are disposed in overlapping positions with the refrigerant passages interposed therebetween. The second power converter and the third power converter, which operate while the electric energy storage device is being charged, are not disposed in overlapping positions with the refrigerant passages interposed therebetween. Consequently, when the first through third power converters are cooled by the common cooling unit, the power converters that are operated at overlapping timings are cooled in different cooling positions, whereas the power converters that are operated at different timings are cooled in cooling positions located on respective sides of the cooling unit with the cooling unit interposed therebetween. Therefore, cooling efficiency is increased, making it possible to reduce the size of the power control unit.

The first power converter may comprise an inverter for energizing a traction motor, the second power converter may comprise a charger mounted on the electric vehicle, the third power converter may comprise a DC/DC converter, and a current that flows through the charger and the DC/DC converter may be smaller than a current that flows through the inverter.

The power control unit may further comprise a diode connected to a quick charging line, wherein the diode is cooled by the first surface of the cooling unit.

According to the present invention, there is also provided a power control unit for an electric vehicle, which charges an electric energy storage device mounted on the electric vehicle from a power supply located outside of the electric vehicle, and supplies electric power from the electric energy storage device to an electric motor in the electric vehicle thereby to generate propulsive power for the electric vehicle, the power control unit comprising a housing, a cooling unit disposed in the housing and having a first surface and a second surface opposite to the first surface with a refrigerant passage interposed therebetween, a first power converter, which operates while the electric vehicle is being driven, the first power converter being cooled by the first surface of the cooling unit, and a second power converter, which operates while the electric energy storage device is being charged by the power supply located outside of the electric vehicle, the second power converter being cooled by the second surface of the cooling unit. The first power converter and the second power converter are disposed in overlapping positions as viewed along a direction from the first surface toward the second surface of the cooling unit.

According to the present invention, the first power converter, which operates while the electric vehicle is being driven, and the second power converter, which operates while the electric energy storage device is being charged, are disposed in overlapping positions with the refrigerant passages interposed therebetween. On the other hand, the first and second power converters, which operate at different timings, are cooled in cooling positions on one side and the other side of the cooling unit with the cooling unit interposed therebetween. Therefore, cooling efficiency is increased, thus making it possible to reduce the size of the power control unit.

DESCRIPTION OF EMBODIMENTS

1. Description of Overall Arrangement

[Overall Arrangement]

Figure 1:
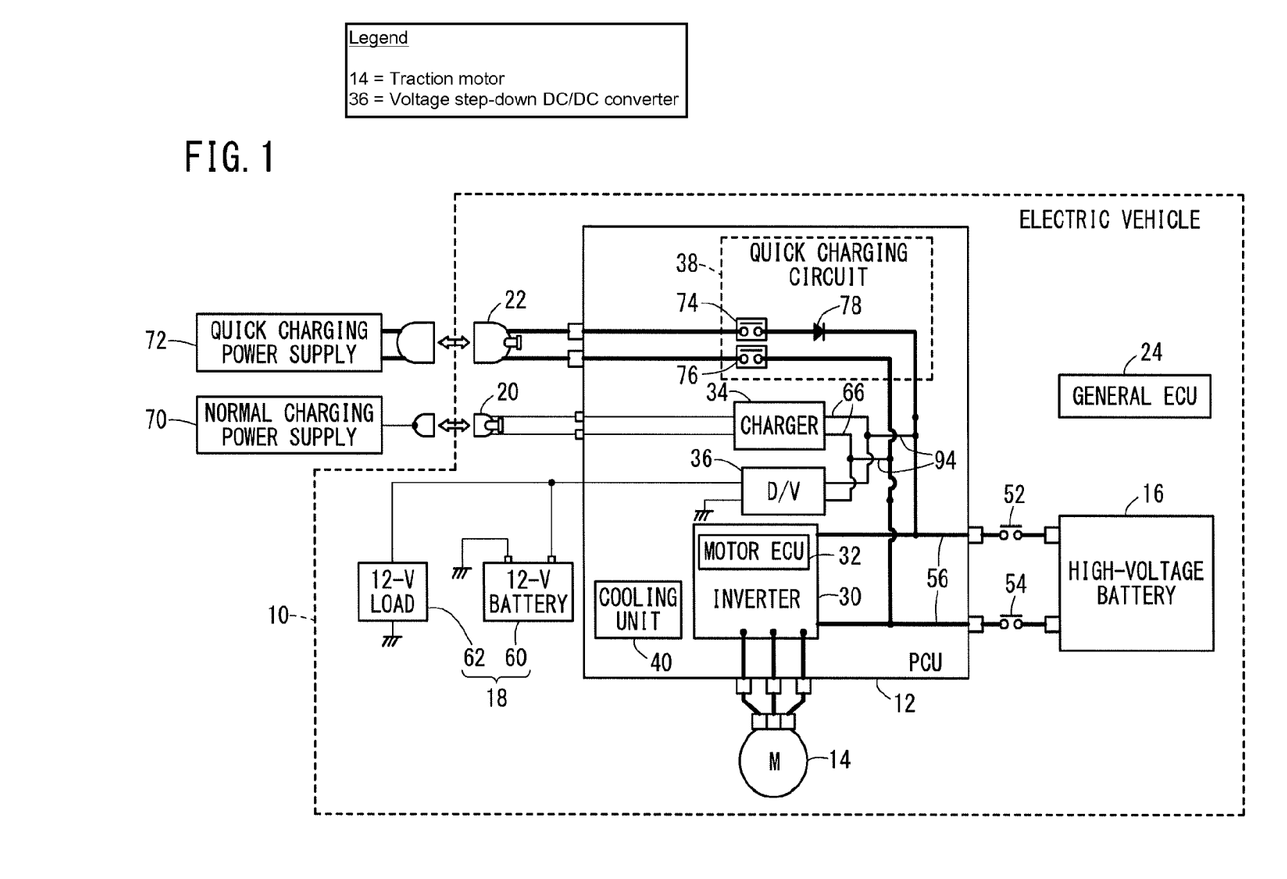
FIG. 1 is a block diagram showing a general overall arrangement of an electric vehicle incorporating therein a power control unit (PCU) according to an embodiment of the present invention.

FIG. 1 is a block diagram showing a general overall arrangement of an electric vehicle 10 (hereinafter also referred to as a "vehicle 10") incorporating therein a power control unit 12 (hereinafter referred to as a "PCU 12") according to an embodiment of the present invention. The vehicle 10 includes, in addition to the PCU 12, a traction motor 14 (hereinafter referred to as a "motor 14"), a high-voltage battery 16 (hereinafter referred to as a "battery 16"), a 12-volt system 18, a normal charging connector 20, a quick charging connector 22, and a general electronic control unit 24 (hereinafter referred to as a "general ECU 24").

Figure 2:
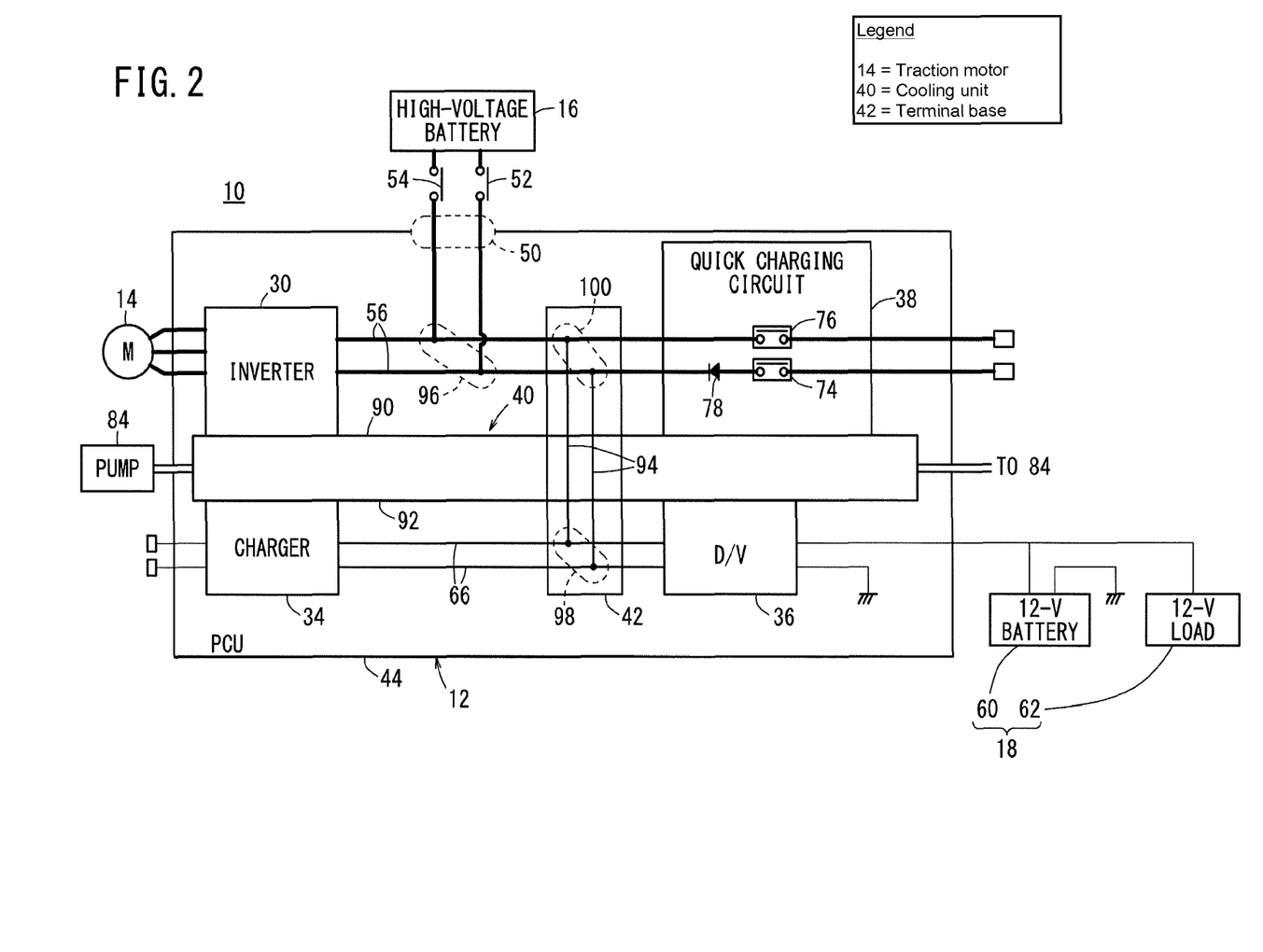
FIG. 2 is a diagram showing a vertical positional relationship between components accommodated in a housing of the PCU.
Figure 3:
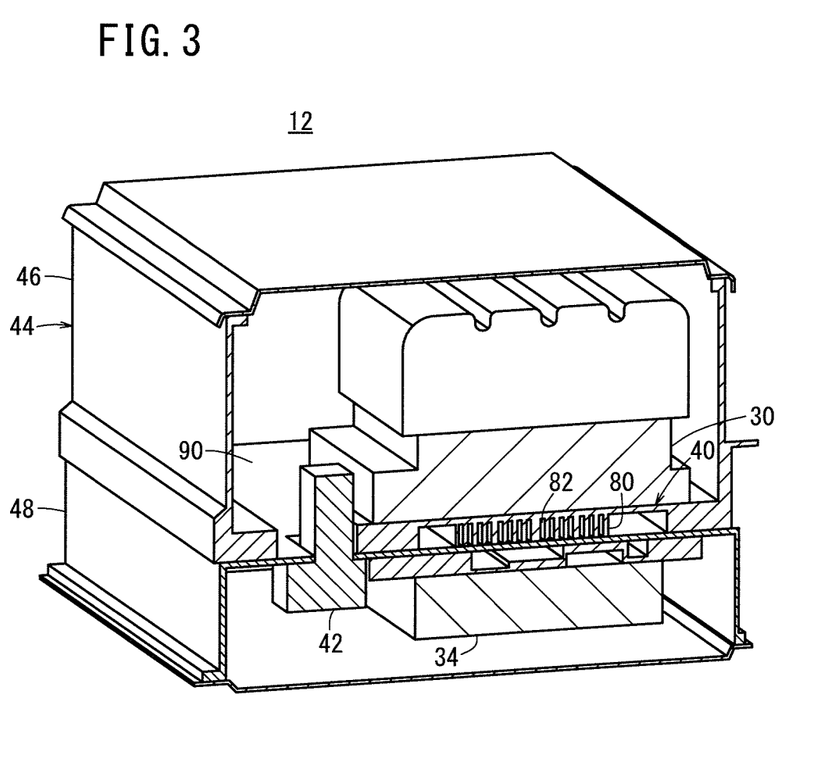
FIG. 3 is a perspective view showing a general positional relationship between components of the PCU.

The PCU 12 has an inverter 30 (first power converter), a motor electronic control unit 32 (hereinafter referred to as a "motor ECU 32"), a charger 34 (second power converter), a voltage step-down DC/DC converter 36 (hereinafter referred to as a "downverter 36") (third power converter), a quick charging circuit 38, a cooling unit 40, a through terminal base 42 (cooling unit traversing member) (see FIG. 2, etc.), and a housing 44 constituted from an upper member 46 and a lower member 48 (FIG. 3).

In FIG. 1, the positional relationship between the components is not illustrated. The layout of the components of the PCU 12 will be described later with reference to FIGS. 2 through 5.

[Drive System]

The motor 14 comprises a three-phase brushless motor. The motor 14 generates a drive force F [N] or a torque [N·m] based on electric power that is supplied from the battery 16 via the inverter 30 when the motor 14 is in a power mode. The motor 14 also charges the battery 16 by outputting to the battery electric power (regenerative electric power Preg) [W], which is generated by the motor 14 when the motor 14 is in a regenerative mode. The motor 14 may output the regenerative electric power Preg to the 12-volt system 18 or to other auxiliaries, not shown.

The inverter 30, which has a three-phase bridge configuration, performs a DC/AC conversion process for converting a direct current into a three-phase alternating current and supplying the three-phase alternating current to the motor 14, as well as for converting a three-phase alternating current generated by the motor 14 in the regenerative mode into a direct current and supplying the direct current to the battery 16.

The motor 14 and the inverter 30 operate while the vehicle 10 is being driven, with the motor 14 operating in the power mode or in the regenerative mode. Unless specified otherwise, while the vehicle 10 is being driven, the motor 14 may be operated in either the power mode or the regenerative mode.

The battery 16 comprises an electric energy storage device including a plurality of battery cells. The battery 16 may be a lithium ion secondary battery, a nickel hydrogen secondary battery, or a capacitor, for example. According to the present embodiment, the battery 16 comprises a lithium ion secondary battery. The housing 44 (FIG. 3) has a housing wall penetrating region 50 (FIG. 2), which joins the inside of the housing 44 and the outside of the housing 44 to each other. Switches 52, 54 are connected to high-voltage first electric power lines 56 that extend through the housing wall penetrating region 50 between the inverter 30 and the battery 16.

The motor ECU 32 controls the inverter 30 based on a command from the general ECU 24, and outputs signals from various sensors (not shown) to control the output power, i.e., propulsive power, of the motor 14.

[Downverter 36 and 12-Volt System 18]

Based on a command from the general ECU 24, the downverter 36, which comprises a DC/DC converter, steps down a high voltage from the high-voltage first electric power lines 56 into a low voltage, and outputs the low voltage to the 12-volt system 18.

The 12-volt system 18 comprises a 12-volt battery 60 and a 12-volt load 62 (auxiliary). Components of the 12-volt system 18 are operable while the vehicle 10 is being driven, as well as while the battery 16 is being charged externally.

[External Charging System]

As shown in FIG. 1, the charger 34 is connected to a normal charging power supply 70, which is located outside of the vehicle 10, through the normal charging connector 20. The charger 34 steps up an output voltage from the normal charging power supply 70, which is of about 120 V, into a high voltage, and then outputs the high voltage to second electric power lines 66.

As shown in FIG. 1, the quick charging circuit 38 is connected to a quick charging power supply 72, which is located outside of the vehicle 10, through the quick charging connector 22. The quick charging circuit 38 supplies an output voltage from the quick charging power supply 72, which is of about 240 V, to the high-voltage first electric power lines 56. The quick charging circuit 38 comprises switches 74, 76 and a diode 78.

[Cooling Unit 40]

As shown in FIGS. 2 and 3, the cooling unit 40 includes cooling fins 80, refrigerant passages 82, a refrigerant (not shown) that flows through the refrigerant passages 82, and a pump 84 for circulating the refrigerant through the refrigerant passages 82. Based on a command from the general ECU 24, the cooling unit 40 operates while the vehicle 10 is being driven, as well as while the battery 16 is being charged externally.

[General ECU 24]

The general ECU 24 serves to manage the vehicle 10 in its entirety. According to the present embodiment, the general ECU 24 controls, via non-illustrated communication lines, the switches 52, 54 connected to the high-voltage battery 16, the motor ECU 32, the charger 34, the downverter 36, the switches 74, 76 of the quick charging circuit 38, and the pump 84 of the cooling unit 40.

2. Layout of Various Components

Figure 4:
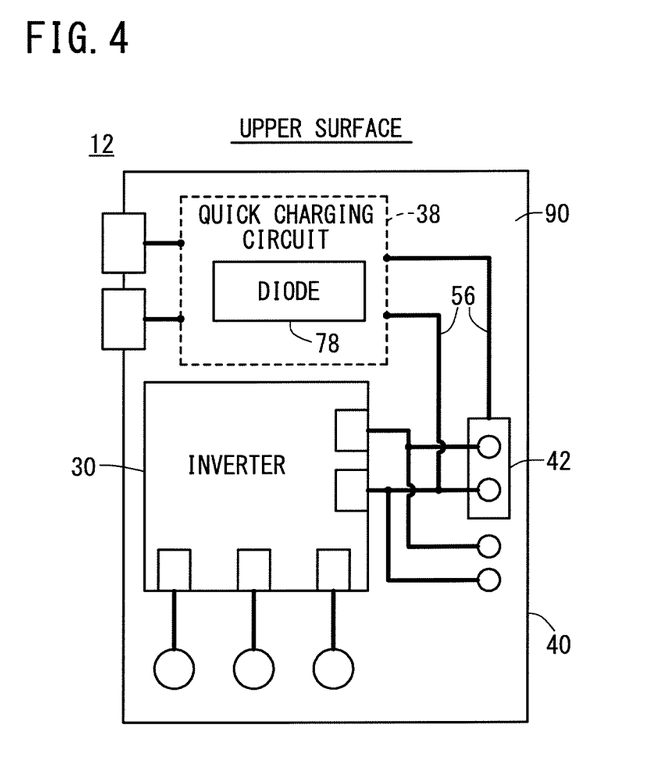
FIG. 4 is a plan view showing a more specific layout of the components, which are disposed on an upper surface of a cooling unit.
Figure 5:
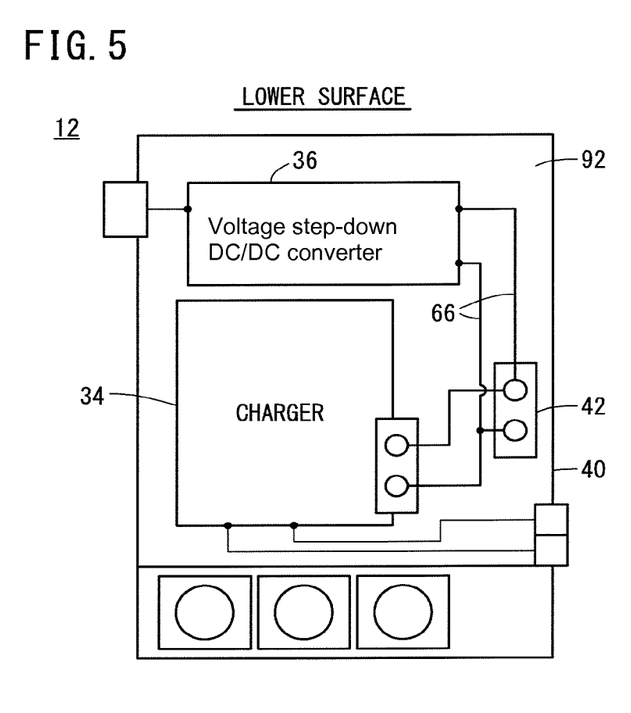
FIG. 5 is a bottom view showing a more specific layout of the components, as illustrated in a vertically upside down orientation on a lower surface of the cooling unit.

FIG. 2 is a diagram showing a vertical positional relationship between components accommodated in the housing 44 of the PCU 12. FIG. 3 is a perspective view showing a general positional relationship between components of the PCU 12. FIG. 4 is a plan view showing a more specific layout of the components, which are disposed on an upper surface (hereinafter referred to as an "upper surface 90") of the cooling unit 40. FIG. 5 is a bottom view showing a more specific layout of the components, as illustrated in a vertically upside down orientation, on a lower surface (hereinafter referred to as a "lower surface 92") of the cooling unit 40. The components are illustrated in a vertically upside down orientation in FIG. 5 in order to facilitate understanding of the positional relationship between the components. Stated otherwise, FIG. 5 shows the layout of the components as seen when the housing 44 is viewed in plan. When the housing 44 is viewed in plan, vertical and horizontal positions of the components shown in FIGS. 4 and 5 are in agreement with each other.

As shown in FIGS. 2 through 5, the cooling unit 40 extends horizontally in the housing 44, i.e., in the lateral direction in FIG. 2. The inverter 30 and the quick charging circuit 38 including the diode 78 are mounted on the upper surface 90 of the cooling unit 40. The charger 34 and the downverter 36 are mounted on the lower surface 92 of the cooling unit 40. In FIG. 2, the inverter 30 and the charger 34 are disposed in overlapping positions as viewed vertically, and the downverter 36 and the quick charging circuit 38 are disposed in overlapping positions as viewed vertically, whereas the inverter 30 and the downverter 36 are disposed in different positions as viewed vertically.

The through terminal base 42 interconnects an upper surface 90 side and a lower surface 92 side of the cooling unit 40. As shown in FIG. 3, the through terminal base 42 is positioned remotely from the refrigerant passages 82 of the cooling unit 40.

3. Arrangement of First Through Third Electric Power Lines 56, 66, 94

For illustrative purposes, on the upper surface 90 side, a first branch 96 (see FIG. 2) will be defined as a region where the inverter 30, the through terminal base 42, and the housing wall penetrating region 50 are connected to each other. On the lower surface 92 side, a second branch 98 will be defined as a region where the charger 34, the downverter 36, and the through terminal base 42 are connected to each other. On the upper surface 90 side, a third branch 100 will be defined as a region proximate to the upper end of the through terminal base 42.

According to the present embodiment, the inverter 30 and the quick charging circuit 38, which are disposed on the upper surface 90 of the cooling unit 40, consist of components that handle a relatively high voltage of several hundred volts, for example. Therefore, since relatively large eddy currents are generated in the first electric power lines 56 that interconnect the battery 16, the inverter 30, and the quick charging circuit 38 through the first branch 96 and the third branch 100, relatively thick conductive wires should be used for the first electric power lines 56.

On the other hand, the charger 34 and the downverter 36, which are disposed on the lower surface 92 of the cooling unit 40, consist of components that handle a relatively low voltage in a range from 10 to 120 volts, for example. Therefore, since relatively small eddy currents are generated in the second electric power lines 66, which interconnect the charger 34 and the downverter 36 through the second branch 98, and in the third electric power lines 94, which interconnect the second branch 98 and the third branch 100, relatively thin conductive wires can be used for the second electric power lines 66 and the third electric power lines 94.

4. Operation of Components while Vehicle 10 is being Driven and while Battery 16 is being Charged by External Power Supplies (1) While Vehicle 10 is being Driven:

While the vehicle 10 is being driven, the switches 52, 54, which are connected to the battery 16, are turned on, and the inverter 30, the downverter 36, and the cooling unit 40 are placed in operation. On the other hand, the charger 34 and the switches 74, 76 of the quick charging circuit 38 are turned off.

When the vehicle 10 is in the power mode, the motor 14 is supplied with electric power from the battery 16 through the inverter 30, and the battery 16 generates propulsive power for the vehicle 10. When the vehicle 10 is in the regenerative mode, the battery 16 is supplied with regenerative electric power Preg from the motor 14 through the inverter 30 and is charged thereby. The downverter 36 steps down the voltage from the battery 16 or the voltage from the motor 14 into a lower voltage, and supplies the lower voltage to the 12-volt battery 60 and the 12-volt load 62.

While the vehicle 10 is being driven, therefore, the inverter 30 is placed in operation, however, the charger 34, which is disposed opposite to the inverter 30 with the cooling unit 40 interposed therebetween, is shut off. Therefore, the inverter 30 is cooled efficiently. Similarly, the downverter 36 is placed in operation, but the quick charging circuit 38 is turned off. Therefore, the downverter 36 is cooled efficiently.

(2) While Battery 16 is being Charged by Normal Charging Power Supply 70:

When the battery 16 is charged by the normal charging power supply 70, the switches 52, 54, which are connected to the battery 16, the charger 34, the downverter 36, and the cooling unit 40, are turned on. On the other hand, the inverter 30 and the switches 74, 76 of the quick charging circuit 38 are turned off.

Consequently, the charger 34 is placed in operation, but the inverter 30, which is disposed opposite to the inverter 30 with the cooling unit 40 interposed therebetween, is shut off. Therefore, the charger 34 is cooled efficiently. Similarly, the downverter 36 is placed in operation, but the quick charging circuit 38 is turned off. Therefore, the downverter 36 is cooled efficiently.

(3) While Battery 16 is being Charged by Quick Charging Power Supply 72:

When the battery 16 is charged by the quick charging power supply 72, the switches 52, 54, which are connected to the battery 16, the switches 74, 76 of the quick charging circuit 38, the downverter 36, and the cooling unit 40, are turned on. On the other hand, the inverter 30 and the charger 34 are turned off.

At this time, since the downverter 36 and the quick charging circuit 38 are turned on, cooling efficiency may be lower than when the vehicle 10 is being driven or when the battery 16 is being charged by the normal charging power supply 70. However, since the heat generated by the downverter 36 usually is smaller than the heat generated by the inverter 30 and the charger 34, any reduction in cooling efficiency is minimized.

While the battery 16 is being charged by the quick charging power supply 72, the downverter 36 may be turned off in order to increase the cooling efficiency of the quick charging circuit 38.

5. Advantages of Present Embodiment

As described above, the inverter 30 and the downverter 36, which are in operation while the vehicle is being driven, are not disposed in overlapping positions with the refrigerant passages 82 of the cooling unit 40 interposed therebetween. On the other hand, the inverter 30, which is in operation while the vehicle is being driven, and the charger 34, which is in operation while the battery 16 is being charged, are disposed in overlapping positions with the refrigerant passages 82 interposed therebetween. The charger 34 and the downverter 36, which are in operation while the battery 16 is being charged, are not disposed in overlapping positions with the refrigerant passages 82 interposed therebetween. Consequently, if the inverter 30, the charger 34, and the downverter 36 are cooled by the common cooling unit 40, the power converters thereof, which are placed in operation at overlapping timings, are cooled in different cooling positions, whereas the power converters, which are placed in operation at different timings, are cooled in cooling positions on one side and the other side of the cooling unit 40 with the refrigerant passages 82 interposed therebetween. Therefore, cooling efficiency is increased, making it possible to reduce the size of the PCU 12.

According to the present embodiment, the current that flows through the charger 34 and the downverter 36 is smaller than the current that flows through the inverter 30. As a result, the third electric power lines 94 on the through terminal base 42 can be made thinner, thus making it possible to further reduce the size of the PCU 12.

According to the present embodiment, the diode 78 is connected to one of the first electric power lines 56 that serves as a quick charging line, and is cooled by the upper surface 90 of the cooling unit 40. Since the diode 78 is cooled by the cooling unit 40, which is shared by the inverter 30, the charger 34, and the downverter 36, there is no need for a dedicated cooling device to be provided for cooling the diode 78. Further, since the diode 78 is cooled by the upper surface 90 of the cooling unit 40, it is not necessary to increase the diameter of the through terminal base 42, thus making it possible to provide the PCU 12 in a compact configuration.

6. Modifications

The present invention is not limited to the above embodiment, but may adopt various alternative arrangements based on the above-described disclosure. For example, the present invention may adopt the following arrangements.

In the above embodiment, the PCU 12 is mounted on the electric vehicle 10. However, the PCU 12 may be mounted on other objects. For example, the PCU 12 may be mounted on other mobile objects, including ships, aircrafts, etc., or may be incorporated in electric power systems for home use.

In the above embodiment, only the battery 16 is used as a propulsive source for the vehicle 10. However, in addition to the battery 16, an engine may be mounted in a vehicle (hybrid vehicle). Alternatively, instead of the battery 16, a fuel cell may be mounted in a vehicle (fuel cell vehicle).

In the above embodiment, components that handle high voltage are mounted on the upper surface 90 of the cooling unit 40, whereas components that handle low voltage are mounted on the lower surface 92 of the cooling unit 40. However, conversely, components that handle low voltage may be mounted on the upper surface 90 of the cooling unit 40, whereas components that handle high voltage may be mounted on the lower surface 92 of the cooling unit 40.

Figure 6:
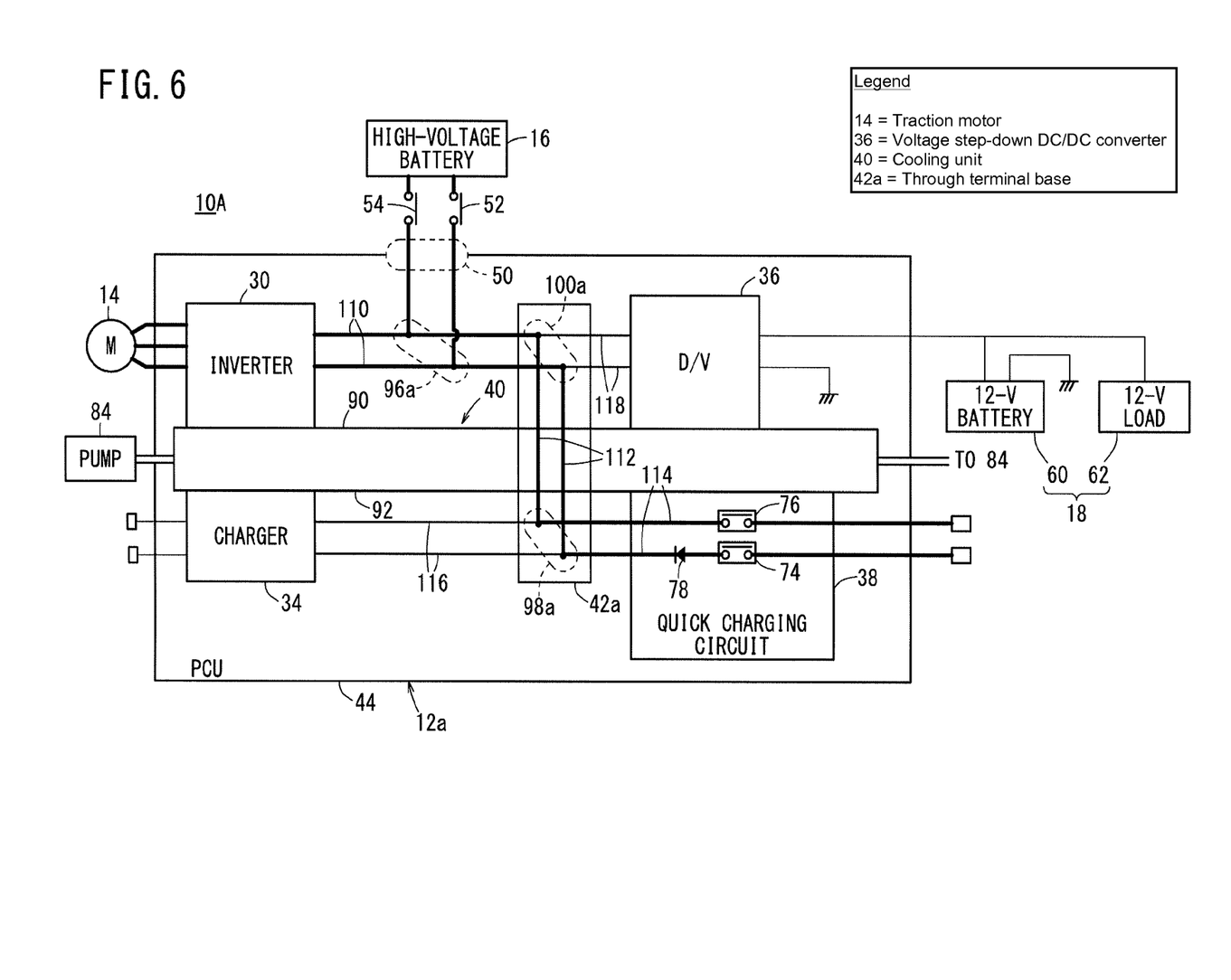
FIG. 6 is a diagram showing a vertical positional relationship between components accommodated in a housing of a PCU according to a modification of the PCU of the aforementioned embodiment.
Figure 7:
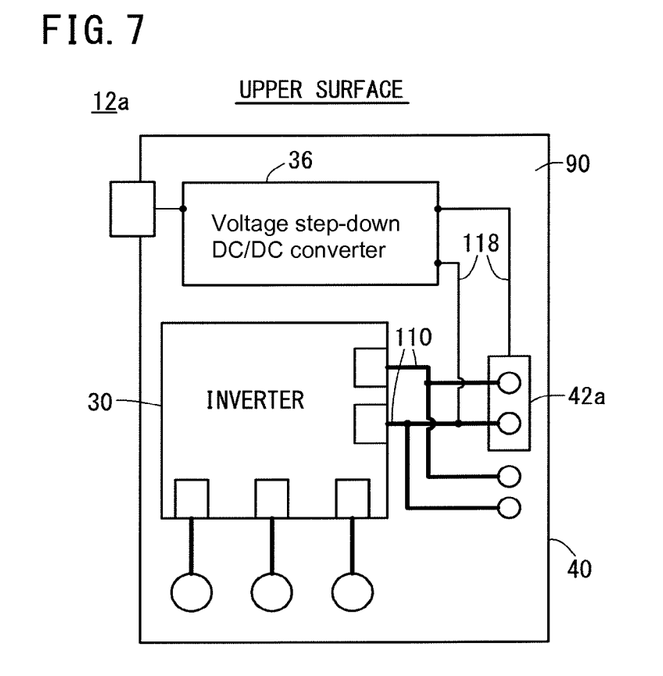
FIG. 7 is a plan view showing a more specific layout of the components, which are disposed on an upper surface of a cooling unit according to the modification.
Figure 8:
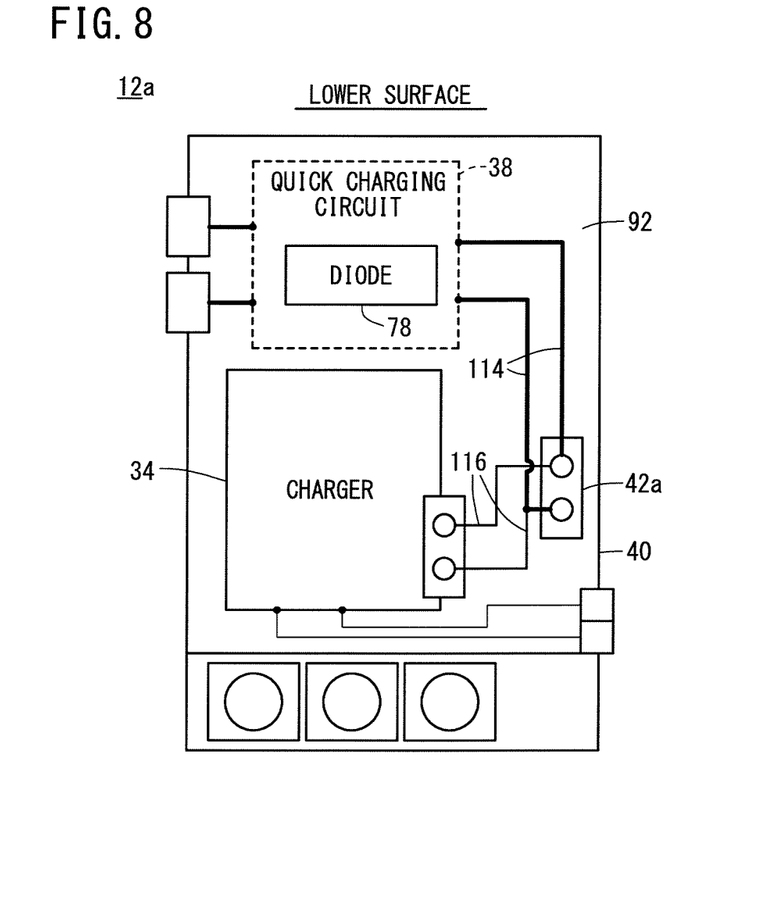
FIG. 8 is a bottom view showing a more specific layout of the components, as illustrated in a vertically upside down orientation on a lower surface of the cooling unit according to the modification.

In the above embodiment, the downverter 36 is mounted on the lower surface 92, whereas the quick charging circuit 38 is mounted on the upper surface 90. However, as shown in FIGS. 6, 7 and 8, in a power control unit 12a (hereinafter referred to as a "PCU 12a") of an electric vehicle 10A (hereinafter also referred to as a "vehicle 10A"), which is a modification of the above-described electric vehicle 10, the inverter 30 and the downverter 36 are mounted on the upper surface 90, and the charger 34 and the quick charging circuit 38 are mounted on the lower surface 92. Other components, which are possessed in common by the vehicles 10 and 10A, are denoted by identical reference characters, and such features will not be described below.

For illustrative purposes, as shown in FIG. 6, on the upper surface 90 side above the cooling unit 40, a region where the inverter 30, a through terminal base 42a, and the housing wall penetrating region 50 are connected to each other will be defined as a first branch 96a. On the lower surface 92 side, a region where the charger 34, the downverter 36, and the through terminal base 42a are connected to each other will be defined as a second branch 98a. On the upper surface 90 side, a region of the through terminal base 42a near the upper end thereof will be defined as a third branch 100a.

In the PCU 12a, high-voltage electric power lines extend between the battery 16 and the inverter 30, as well as between the battery 16 and the quick charging circuit 38. More specifically, high-voltage fourth electric power lines 110 on the upper surface 90 side interconnect the battery 16, the inverter 30, and the third branch 100a of the through terminal base 42a. In addition, high-voltage fifth electric power lines 112 interconnect the second branch 98a and the third branch 100a. Further, high-voltage sixth electric power lines 114 interconnect the quick charging circuit 38 and the second branch 98a.

In the PCU 12a, low-voltage electric power lines extend between the charger 34 and the second branch 98a, as well as between the downverter 36 and the third branch 100a. More specifically, low-voltage seventh electric power lines 116 on the lower surface 92 side interconnect the charger 34 and the second branch 98a, and low-voltage eighth electric power lines 118 on the upper surface 90 side interconnect the downverter 36 and the third branch 100a.

The PCU 12a, which is constructed in the foregoing manner, offers the same advantages as the PCU 12 according to the above embodiment. More specifically, the inverter 30, which is placed in operation while the vehicle is being driven, and the charger 34, which is placed in operation while the battery 16 is being charged, are disposed in overlapping positions with the refrigerant passages 82 interposed therebetween. Consequently, the inverter 30 and the charger 34, which are placed in operation at different timings, are cooled in cooling positions on one side and the other side of the cooling unit 40 with the refrigerant passages 82 interposed therebetween. Therefore, cooling efficiency is increased, making it possible to reduce the size of the PCU 12a.

In addition, the inverter 30 and the downverter 36, which operate while the vehicle is being driven, are not disposed in overlapping positions with the refrigerant passages 82 interposed therebetween. Further, the charger 34 and the downverter 36, which operate while the battery 16 is being charged, are not disposed in overlapping positions with the refrigerant passages 82 interposed therebetween. Consequently, when the inverter 30, the charger 34, and the downverter 36 are cooled by the common cooling unit 40, the power converters, which are operated at overlapping timings, are cooled in different cooling positions, whereas the power converters, which are operated at different timings, are cooled in respective cooling positions on one side and the other side of the cooling unit 40 with the cooling unit 40 interposed therebetween. Therefore, cooling efficiency is increased, thus making it possible to reduce the size of the PCU 12a.

In the above embodiment, the inverter 30, the charger 34, the downverter 36, and the quick charging circuit 38 serve as objects to be cooled by the cooling unit 40. However, the objects to be cooled are not limited to these components. A DC/DC converter (not shown), for stepping up or down the output voltage from the battery 16 or the output voltage from the motor 14 while the vehicle 10 is in operation, may be disposed between the inverter 30 and the battery 16, and the DC/DC converter may serve as a target to be cooled by the cooling unit 40. Alternatively, the pump 84 of the cooling unit 40 may serve as a target to be cooled by the cooling unit 40.

The invention claimed is:

1. A power control unit for an electric vehicle, which charges an electric energy storage device mounted on the vehicle from a power supply located outside of the vehicle, and supplies electric power from the electric energy storage device to an electric motor in the vehicle thereby to generate propulsive power for the vehicle, the power control unit comprising:
   a housing;
   a cooling unit disposed in the housing and having a first surface and a second surface opposite to the first surface with a refrigerant passage interposed therebetween;
   a first power converter, which operates while the electric vehicle is being driven, the first power converter being cooled by the first surface of the cooling unit;
   a second power converter, which operates while the electric energy storage device is being charged by the power supply located outside of the vehicle, the second power converter being cooled by the second surface of the cooling unit;
   a third power converter, which operates while the electric vehicle is being driven and while the electric energy storage device is being charged by the power supply located outside of the vehicle, the third power converter being cooled by the second surface of the cooling unit; and
   electric power conductors interconnecting the first power converter, the second power converter, and the third power converter;
   wherein the electric power conductors include:
   a housing wall penetrating region that joins an inside of the housing and an outside of the housing to each other;
   a cooling unit traversing member interconnecting a first surface side and a second surface side of the cooling unit;
   a first branch interconnecting the housing wall penetrating region, the cooling unit traversing member, and the first power converter on the first surface side; and
   a second branch interconnecting the cooling unit traversing member, the second power converter, and the third power converter on the second surface side;
   wherein the first power converter and the third power converter are disposed in different positions as viewed along a direction from the first surface toward the second surface of the cooling unit; and
   the first power converter and the second power converter are disposed in overlapping positions as viewed along the direction from the first surface toward the second surface of the cooling unit.

2. The power control unit for an electric vehicle according to claim 1, wherein the first power converter comprises an inverter for energizing a traction motor as the electric motor; the second power converter comprises a charger mounted on the electric vehicle; the third power converter comprises a DC/DC converter; and
   a current that flows through the charger and the DC/DC converter is smaller than a current that flows through the inverter.

3. The power control unit for an electric vehicle according to claim 2, further comprising:
   a diode connected to a quick charging line;
   wherein the diode is cooled by the first surface of the cooling unit.

4. A power control unit for an electric vehicle, which charges an electric energy storage device mounted on the vehicle from a power supply located outside of the vehicle, and supplies electric power from the electric energy storage device to an electric motor in the vehicle thereby to generate propulsive power for the vehicle, the power control unit comprising:
   a housing;
   a cooling unit disposed in the housing and having a first surface and a second surface opposite to the first surface with a refrigerant passage interposed therebetween;
   a first power converter, which operates while the electric vehicle is being driven, the first power converter being cooled by the first surface of the cooling unit; and
   a second power converter, which operates while the electric energy storage device is being charged by the power supply located outside of the vehicle, the second power converter being cooled by the second surface of the cooling unit; and a third power converter, which operates while the electric vehicle is being driven and while the electric energy storage device is being charged by the power supply located outside of the vehicle, the third power converter being cooled by the second surface of the cooling unit;

wherein the first power converter comprises an inverter for energizing a traction motor as the electric motor;

the second power converter comprises a charger mounted on the electric vehicle;

the third power converter comprises a DC/DC converter; and the first power converter and the second power converter are disposed in overlapping positions as viewed along a direction from the first surface toward the second surface of the cooling unit.

* * * * *